UNITED STATES PATENT OFFICE.

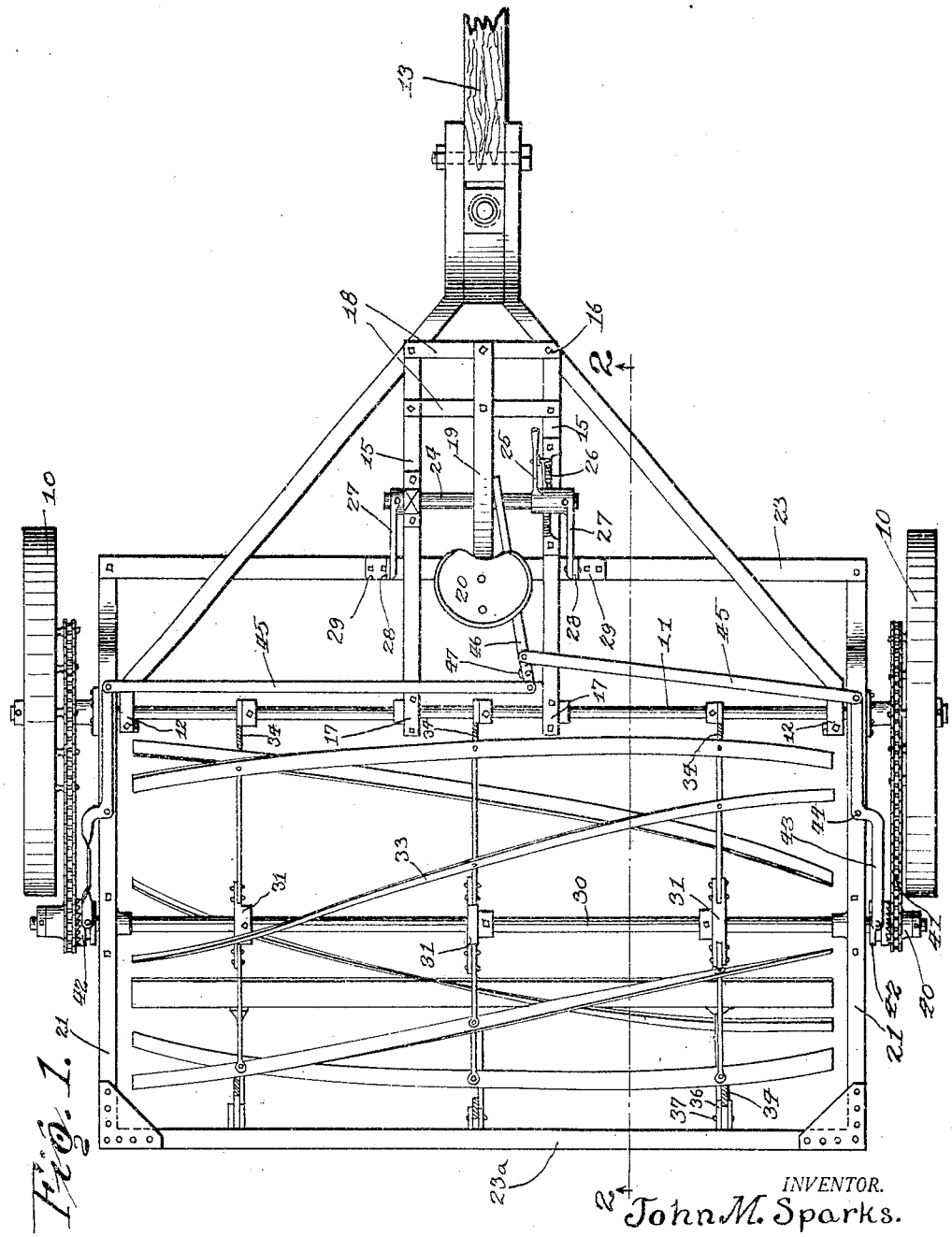

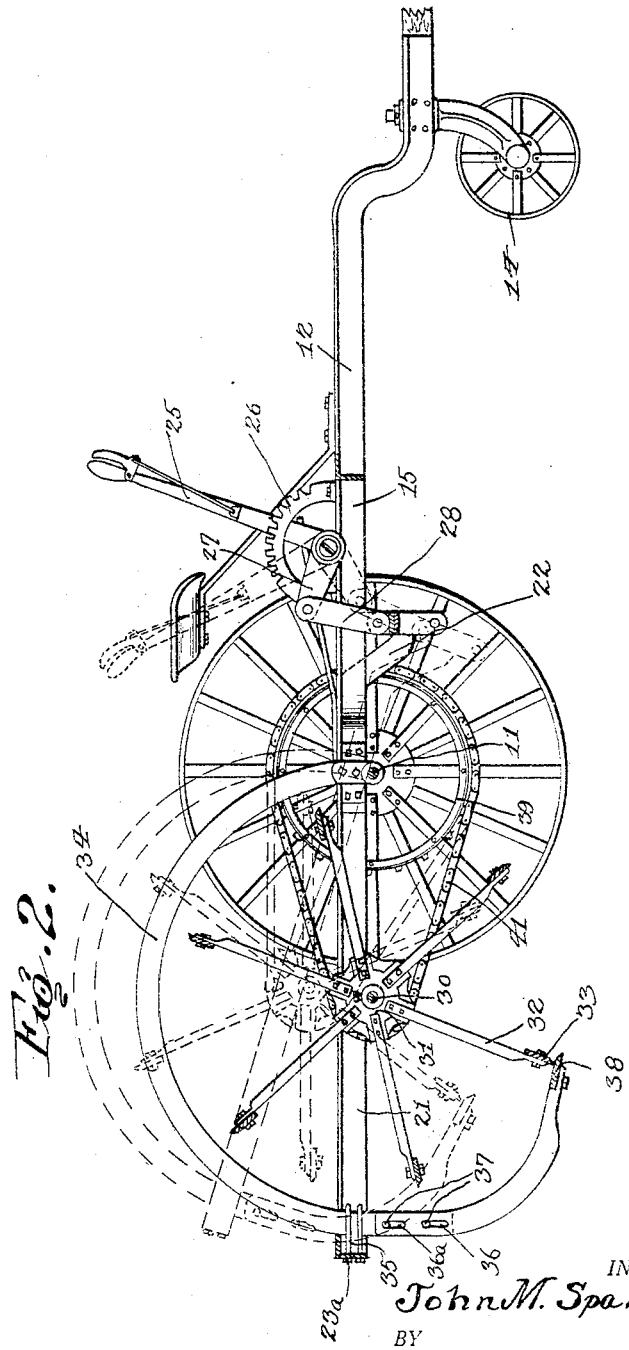

JOHN M. SPARKS, OF WASHTUCNA, WASHINGTON.

WEED-CUTTER.

1,381,358.  Specification of Letters Patent.  Patented June 14, 1921.

Application filed December 4, 1920. Serial No. 428,299.

*To all whom it may concern:*

Be it known that I, JOHN M. SPARKS, a citizen of the United States, residing at Washtucna, in the county of Adams and State of Washington, have invented certain new and useful Improvements in Weed-Cutters, of which the following is a specification, reference being had to the accompanying drawings.

This invention relates to improvements in weed cutters, and more particularly to a device for severing weeds at a point beneath the ground, and therefore, beneath the crown of the weed in order that the same may be effectually destroyed.

A further object of the invention is to provide a device of this character which may be readily adjusted to determine the depth beneath the ground at which the weeds are severed and to remove the cutters from engagement with the ground when removing the cutters from place to place.

A still further object of the invention is to provide a device of this character which is extremely simple in construction, and therefore, not expensive to manufacture.

To this end the invention consists in a wheel-supported main frame upon which is pivotally mounted an auxiliary frame together with means carried by the main frame whereby the auxiliary frame may be tilted to bring the cutter blades carried thereby into and out of engagement with the ground, and furthermore consists in the details of construction of the device as hereinafter will be more fully set forth.

Other objects and advantages of the invention will become apparent throughout the following description:

In the accompanying drawings, wherein for the purpose of illustration is shown a preferred embodiment of my invention, and wherein like reference characters designate like parts throughout:

Figure 1 is a plan view of a weed cutter constructed in accordance with my invention, and Fig. 2 is a section taken on the line 2—2 of Fig. 1.

Referring now more particularly to the drawings, the numeral 10 indicates supporting and driving wheels which are rotatably mounted upon the ends of the transverse shaft or axle 11. To this shaft at a point spaced inwardly from the wheels 10 are secured the rear ends of the side frames 12 of the main frame, which side frames converge forwardly and receive between the forward ends thereof a draft bar 13 of any desired construction. The forward end of the main frame is supported by a caster wheel 14.

The main frame further consists of spaced, parallel, longitudinally extending supporting bars 15 having their forward ends secured to the side bars 12 adjacent the forward ends thereof, as at 16, and their rear ends secured to the axle, as at 17. Adjacent the forward ends of the side bars 15, transverse bracing bars 18 are disposed and form an attaching medium for a spring seat support 19 provided at its upper end with the usual seat 20.

The numeral 21 indicates the side bars of an auxiliary frame, which side bars are pivotally mounted at points adjacent to but spaced from their forward ends upon the shaft 11, the forward ends of the side bars being downwardly turned, as at 22, and being connected by a cross bar 23 which passes beneath the main frame. The rear ends of the side bars 21 are similarly connected by a bar 23$^a$.

Mounted upon the parallel side bars 15 of the main frame is a transversely extending shaft 24 having secured thereto a lever 25 which coacts in the usual manner with a segment 26 mounted upon one of the side bars 15. To the ends of the shaft 24 which project beyond the side bars 15 are secured radial arms 27, the free ends of which are pivotally connected to links 28, the opposite ends of which are pivotally connected with ears formed upon and upstanding from plates 29 secured to the forward cross bar 23 of the auxiliary frame. Rotatably mounted in the auxiliary frame on the side bars 21 thereof is a transversely extending shaft 30 spaced from and parallel to the shaft 11, which shaft 30 has secured thereto at spaced points hub portions 31 which in turn have secured thereto radial arms 32, to the free ends of which are secured spirally cutting blades 33.

Rotatably mounted upon, but held against longitudinal shifting with relation to the shaft 11, are the forward ends of arcuate guard bars 34 which extend above the cutting blades 33 and which have their rear ends extending adjacent to the rear crossbar 23$^a$ of the auxiliary frame and secured thereto by U-bolts 35 or the like. The lower ends of the arcuate guard bars 34 extend below the cross bar 23ª for coaction with extension arms 36 likewise arcuately curved and have their lower ends disposed adjacent the path of the cutting blades 33 at the lowermost point thereof. These extension arms are provided in their upper ends with slots 36ª adapted for the reception of bolts 37 whereby the extension arms may be adjustably, vertically positioned upon the guard bars 34. To the lower end of these extension arms is secured a cutting blade 38 against which the cutting blades 33 engage in passing.

Secured to each of the supporting and driving wheels 10 is a sprocket gear 39 and secured to the ends of the shaft 30 which extend beyond the side bars 21 of the auxiliary frame are relatively small sprocket gears 40 which are connected with the sprocket gears 39 by chains 41 so that when the wheels 10 are rotated, the shaft 30 and the cutting blades 33 carried thereby are rotated at a relatively high speed in the same direction as the wheels. These sprocket gears 40 are loosely mounted upon the shaft and each end of the shaft is provided with clutch members 42 slidably mounted thereon but held against rotation with relation thereto, which clutch members are provided with ratchet teeth adapted to coact with similar ratchet teeth formed on the sprocket gears 40, the teeth being so directioned that when the device is moving forwardly, these teeth will remain in engagement, but when the device is moved rearwardly, the teeth of the gears and clutch members are automatically thrown out of engagement. Each of the clutch members 42 is provided with a fork receiving groove adapted to receive a fork carried by the rear end of a lever 43 which is pivotally connected intermediate its ends with a corresponding side bar 41, as at 44, and which has its forward end connected by a link 45 with a lever 46. The links 45 are connected to the lever 46 upon opposite sides of the pivot point 47 thereof so that when the lever 46 is shifted, the clutch members 42 are moved in opposite directions, causing the clutch members to be simultaneously engaged, or disengaged as the case may be.

In the operation of my device and when it is being moved forwardly over the ground, the cutting blade 38 is positioned so that it enters the surface of the ground a desired distance by shifting the lever 25 which tilts the auxiliary frame as desired. The forward movement of the device at this time, if the clutch members are engaged, will cause the rotation of the shaft 30 and the cutting blades 33 carried thereby which coact with the blade 38 in cutting off the weeds at a point below the level of the ground. If, however, the device is moved rearwardly and the clutch members are engaged, these clutch members are automatically thrown out of engagement and the shaft 30 will remain stationary, thereby preventing dulling and destruction of the blades 33 by engagement of the ground thereby in a direction opposite to the direction of movement in which they are intended to be used.

It will be obvious that my device by reason of the simplicity of the construction thereof and the ease with which it may be operated is particularly well adapted for the purpose for which it is intended; and it will likewise be obvious that the construction of the same as hereinbefore set forth is capable of some change without departing from the spirit of my invention. I, accordingly, do not limit myself to the specific structure so set forth, except as so limited by the subjoined claims.

What I claim is:—

1. In a device of the type described, a wheel-supported shaft, a main frame having its rear end secured to the shaft and having its forward end provided with a draft bar, an auxiliary frame embodying side bars pivotally mounted adjacent the forward ends upon said shaft and a forward cross bar extending beneath said main frame, means mounted upon the main frame and connected with said forward cross bar adjustably tilting said auxiliary frame, a stationary cutting blade carried by said auxiliary frame and adapted to be brought into and out of engagement with the ground by the tilting thereof and a rotatable shaft carried by said auxiliary frame and supporting cutting blades adapted to coact with the first named cutting blades.

2. In a weed cutter, a wheel-supported shaft, a main frame having its rear end secured to said shaft, an auxiliary frame pivotally mounted upon said main frame and embodying a cross bar extending beneath said main frame, a transverse shaft mounted upon said main frame, means for adjustably positioning said shaft, arms carried by said shaft, a link connection between said arms and said cross bar whereby said cross bar is vertically positioned by the adjustment of said shaft.

3. In a weed cutter, a wheel-supported shaft, a main frame having its rear end secured to said shaft, an auxiliary frame pivotally mounted adjacent its forward end on said shaft whereby said auxiliary frame may be adjustably shifted about said shaft, a rotatable shaft carried by said auxiliary frame spaced from and parallel to the wheel support shaft, a sprocket gear secured to one of the wheels of said wheel-supported shaft, a sprocket gear loosely mounted upon the shaft of said auxiliary frame, a chain connecting said sprocket gears, a clutch member carried by the shaft of said auxiliary frame and adapted to be shifted into and out of engagement with the sprocket wheel thereof, said clutch member when engaged with said sprocket gear preventing rotation of said sprocket gear with relation to said shaft when the sprocket gear is rotated in a direction corresponding to the direction of rotation of the wheel of the wheel-supported shaft when the cutter is moved forwardly and permitting rotation of said sprocket gear with relation to the shaft of the auxiliary frame when the sprocket gear is rotated in the opposite direction.

4. In a weed cutter, a wheel-supported shaft, a main frame having its rear end secured to said shaft, an auxiliary frame pivotally mounted adjacent its forward end on said shaft whereby said auxiliary frame may be adjustably shifted about said shaft, a rotatable shaft carried by said auxiliary frame spaced from and parallel to the wheel-supported shaft, a member rotatably mounted upon the last named shaft and operatively connected with one of the wheels at the wheel-supported shaft to be driven thereby and means mounted upon the shaft of the auxiliary frame and engageable with said member for locking said member against rotating with relation to the shaft in one direction and permitting rotation of said member independently of the shaft in the opposite direction.

In testimony whereof I hereunto affix my signature.

JOHN M. SPARKS.